United States Patent
Nakazawa et al.

(10) Patent No.: US 12,511,774 B2
(45) Date of Patent: Dec. 30, 2025

(54) IMAGE INFERENCE AND VERIFICATION APPARATUS, METHOD, AND COMPUTER-READABLE STORAGE MEDIUM

(71) Applicant: Rakuten Group, Inc., Tokyo (JP)

(72) Inventors: Mitsuru Nakazawa, Tokyo (JP); Takashi Tomooka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 412 days.

(21) Appl. No.: 18/088,017

(22) Filed: Dec. 23, 2022

(65) Prior Publication Data

US 2023/0206483 A1 Jun. 29, 2023

(30) Foreign Application Priority Data

Dec. 24, 2021 (JP) ................................ 2021-211599

(51) Int. Cl.
*G06T 7/70* (2017.01)
*G06T 5/50* (2006.01)
(Continued)

(52) U.S. Cl.
CPC .................. *G06T 7/70* (2017.01); *G06T 5/50* (2013.01); *G06T 7/50* (2017.01); *G06T 17/00* (2013.01);
(Continued)

(58) Field of Classification Search
CPC .... G06T 7/70; G06T 7/50; G06T 5/50; G06T 17/00; G06T 2207/20221; G06T 19/00; G06T 15/20; G06T 7/246; G06T 15/205; G06T 7/73; G06T 15/10; G06T 19/006; G06V 10/44; G06V 2201/07; G06V 20/20;
(Continued)

(56) References Cited

U.S. PATENT DOCUMENTS 6,226,035 B1 * 5/2001 Korein ................... G03B 17/17
348/335
8,260,567 B1 * 9/2012 Kaplan ................... G01S 11/12
382/107

(Continued)

FOREIGN PATENT DOCUMENTS

JP 2020022072 A * 2/2020
JP 2023074197 A * 5/2023
WO WO-2022101707 A1 * 5/2022 ........... G06T 19/006

OTHER PUBLICATIONS

Ito Tadashi et al. "Sensing Algorithm to Estimate Slight Displacement and Posture Change of Target from Monocular Images", Jan. 2023, MDPI (Year: 2023).*

*Primary Examiner* — Aaron W Carter
*Assistant Examiner* — Alejandro Hernandez
(74) *Attorney, Agent, or Firm* — Sughrue Mion, PLLC

(57) ABSTRACT

Disclosed is an image processing apparatus including a receiving section that receives a captured image of a target object, an instruction section that gives a user an instruction on which direction to capture an image of the target object, an inferencing section that performs an inference of an imaging direction on the basis of the received captured image, and a verifying section that performs predetermined verification processing related to the target object on the basis of an imaging direction as the instructed direction and the imaging direction as a result of the inference.

10 Claims, 7 Drawing Sheets

(51) Int. Cl.
 *G06T 7/50* (2017.01)
 *G06T 17/00* (2006.01)
 *G06V 10/44* (2022.01)

(52) U.S. Cl.
 CPC .... *G06V 10/44* (2022.01); *G06T 2207/20221* (2013.01); *G06V 2201/07* (2022.01)

(58) Field of Classification Search
 CPC ..... G06Q 30/0631; G06F 3/01; G06F 3/0481; G06F 3/14; H04N 23/60; A63F 13/525
 See application file for complete search history.

(56) References Cited

U.S. PATENT DOCUMENTS

| | | | | |
|---|---|---|---|---|
| 9,378,422 | B2* | 6/2016 | Saruta | G06V 20/10 |
| 9,704,028 | B2* | 7/2017 | Kimura | G06F 3/017 |
| 9,869,762 | B1* | 1/2018 | Alland | H01Q 21/08 |
| 11,521,330 | B2* | 12/2022 | Maeda | G06F 18/214 |
| 12,205,275 | B2* | 1/2025 | Masuda | G06F 18/285 |
| 2011/0292402 | A1* | 12/2011 | Awatsuji | G03H 1/0443 |
| | | | | 356/495 |
| 2013/0058530 | A1* | 3/2013 | Naito | G06V 10/56 |
| | | | | 382/103 |
| 2013/0208005 | A1* | 8/2013 | Kasahara | G06T 19/006 |
| | | | | 345/633 |
| 2015/0016673 | A1* | 1/2015 | Kuzuya | G06V 20/20 |
| | | | | 382/103 |
| 2015/0312487 | A1* | 10/2015 | Nomoto | H04N 5/2621 |
| | | | | 348/239 |
| 2019/0011922 | A1* | 1/2019 | Feng | G05D 1/12 |
| 2019/0287154 | A1* | 9/2019 | Kakinuma | G06Q 30/0631 |
| 2019/0287836 | A1* | 9/2019 | Miyata | G01B 11/002 |
| 2019/0340777 | A1* | 11/2019 | Takama | G06T 7/70 |
| 2021/0158561 | A1* | 5/2021 | Park | G06T 7/74 |
| 2021/0365722 | A1* | 11/2021 | Masuda | G06F 18/285 |
| 2023/0014562 | A1* | 1/2023 | Akao | G09G 5/02 |
| 2023/0107626 | A1* | 4/2023 | Yasuda | G05D 1/02 |
| | | | | 198/358 |
| 2024/0112353 | A1* | 4/2024 | Oyama | G06T 7/70 |
| 2024/0346680 | A1* | 10/2024 | Liu | G06F 16/583 |
| 2025/0088617 | A1* | 3/2025 | Iwao | G06T 7/194 |

* cited by examiner

IMAGE INFERENCE AND VERIFICATION APPARATUS, METHOD, AND COMPUTER-READABLE STORAGE MEDIUM

CROSS REFERENCE TO RELATED APPLICATIONS

This non-provisional application claims priority under 35 U.S.C. § 119(a) on Patent Application No. 2021-211599 filed in Japan on Dec. 24, 2021, the entire contents of which are hereby incorporated by reference.

BACKGROUND

The present disclosure relates to an image processing apparatus, an image processing method, and a program that gives an instruction related to the capturing of an image.

Electronic commerce services such as what is called customer to customer (C2C) marketplace services which act as an intermediary between users and allow them to buy and sell items or the like from each other have been widely used. In the electronic commerce services, users may capture images of items and post the captured images. At this time, the electronic commerce services have a chance to suitably assist in trades between users by utilizing the captured images of the items.

SUMMARY

Japanese Patent Laid-Open No. 2020-022072 discloses a technology capable of ensuring that, at a time of user authentication, an image posted online is captured on the spot. The technology disclosed therein is devised for the user authentication, and the object thereof is not to confirm items in the electronic commerce services.

The present disclosure has been made in view of the above-described actual situation. It is desirable to provide an image processing apparatus, an image processing method, and a program that can confirm items in the electronic commerce services and thus assist in trades between users.

According to one aspect of the present disclosure, there is provided an image processing apparatus including a receiving section that receives a captured image of a target object, an instruction section that gives a user an instruction on which direction to capture an image of the target object, an inferencing section that performs an inference of an imaging direction on the basis of the received captured image, and a verifying section that verifies the existence of the target object on the basis of an imaging direction as the instructed direction and the imaging direction as a result of the inference.

According to another aspect of the present disclosure, there is provided an image processing method including, by a processor of a computer, receiving a captured image of a target object, giving a user an instruction on which direction to capture an image of the target object, performing an inference of an imaging direction on the basis of the received captured image, and performing predetermined verification processing related to the target object on the basis of an imaging direction as the instructed direction and the imaging direction as a result of the inference.

According to still another aspect of the present disclosure, there is provided a program for causing a computer to function as a receiving section that receives a captured image of a target object, an instruction section that gives a user an instruction on which direction to capture an image of the target object, an inferencing section that performs an inference of an imaging direction on the basis of the received captured image, and a verifying section that performs predetermined verification processing related to the target object on the basis of an imaging direction as the instructed direction and the imaging direction as a result of the inference.

According to the present disclosure, it is possible to confirm items and thus assist in trades between users.

DETAILED DESCRIPTION OF THE PREFERRED EMBODIMENT

Figure 1:
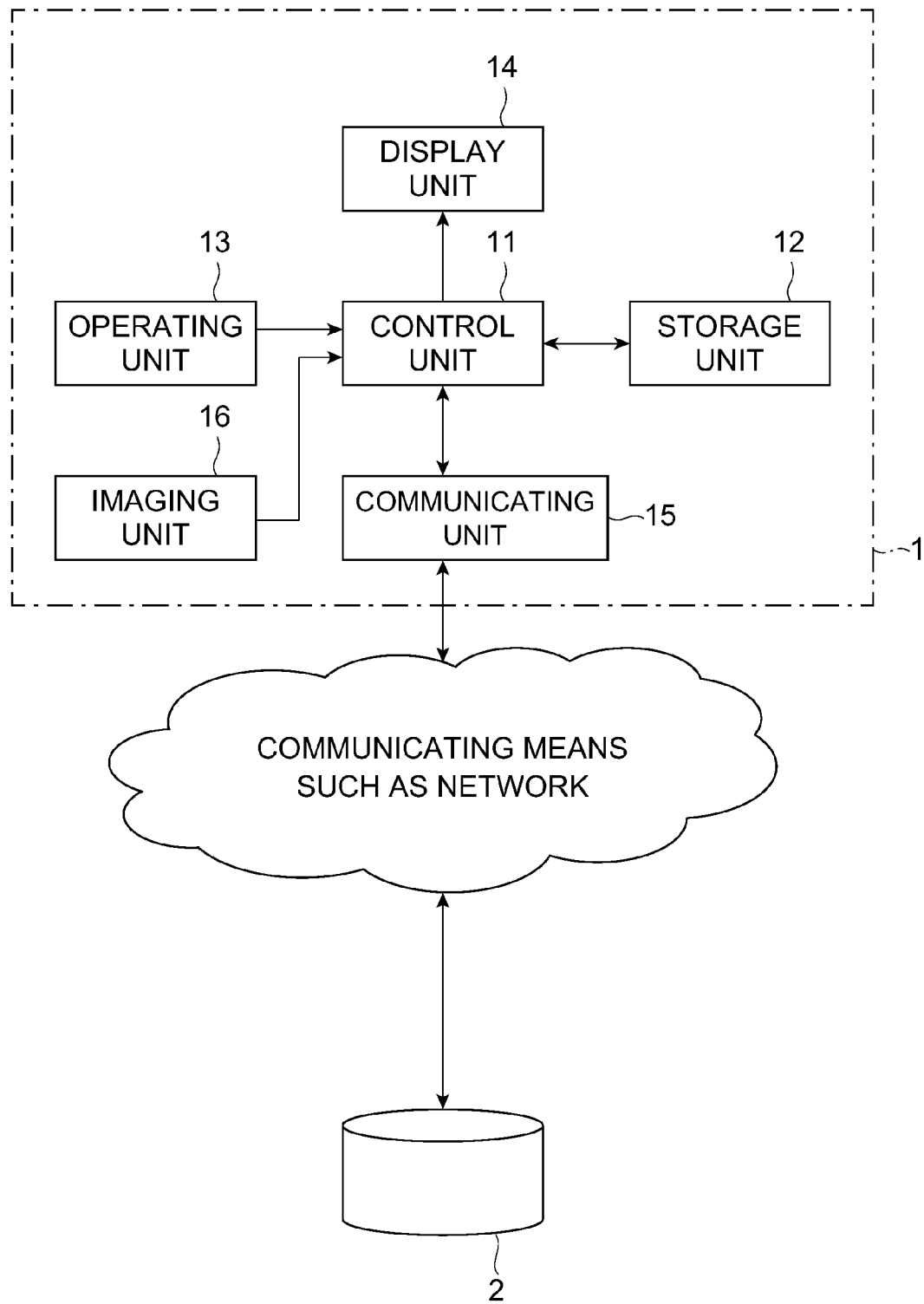
FIG. 1 is a block diagram illustrating an example of a configuration of an image processing apparatus according to an embodiment of the present disclosure.

An embodiment of the present disclosure will be described with reference to the drawings. An image processing apparatus 1 according to the embodiment of the present disclosure can be implemented by an information processing apparatus having a camera function, such as a smart phone. As illustrated in FIG. 1, the image processing apparatus 1 includes a control unit 11, a storage unit 12, an operating unit 13, a display unit 14, a communicating unit 15, and an imaging unit 16. In addition, the image processing apparatus 1 may communicably be connected to a server apparatus 2 via a network.

The control unit 11 is a program-controlled device such as a central processing unit (CPU). The control unit 11 operates according to a program stored in the storage unit 12. In the example of the present embodiment, the control unit 11 controls the imaging unit 16 according to an instruction from a user and receives a captured image of a target object as a subject. Here, the captured image may be, for example, a preview image or any other image of the target object captured by the imaging unit 16 and temporarily stored in a volatile memory such as a random-access memory (RAM) in order to perform display processing or the like, or may be an image of the target object captured by the imaging unit 16 to be recorded in the storage unit 12.

The control unit 11 recognizes the target object on the basis of the received captured image and infers an imaging direction in which the image of the target object is captured. Then, the control unit 11 gives an additional instruction to capture an image of the target object in another direction, on the basis of at least a result of the recognition of the target object and a result of the inference. An example of operation of the control unit 11 will be described later.

In the present embodiment, the imaging direction refers to information regarding the angle and position of a device (camera or the like) having an imaging function. For example, in a case where an elevation angle from an xy plane to be described later is large, the imaging direction is construed as indicating a high angle and a high position. Incidentally, in the present specification, the "imaging direction" will also simply be referred to as a "direction" or the like.

The storage unit 12 is a memory device, a disk device, or the like. The storage unit 12 stores the program to be executed by the control unit 11. This program may be provided in a state of being stored in a computer-readable and non-transitory recording medium, and be copied to the storage unit 12. The storage unit 12 may work as a working memory for control unit 11.

The operating unit 13 is a touch panel or the like disposed in such a manner as to be superposed on the display unit 14. The operating unit 13 receives an operation made by a user and outputs information indicating the details of the operation to the control unit 11. The display unit 14 is a display or the like. The display unit 14 displays an image according to an instruction inputted from the control unit 11.

The communicating unit 15 is an interface for performing communication via a network or a mobile-phone network. For example, the communicating unit 15 outputs data received via the network to the control unit 11 and sends out data to an external server apparatus or the like via the network according to an instruction inputted from the control unit 11. The imaging unit 16 is a camera or the like. The imaging unit 16 sequentially outputs captured images to the control unit 11.

In the present embodiment, the server apparatus 2 that is communicably connected to the image processing apparatus 1 receives, from the image processing apparatus 1, an upload of an image captured and recorded in the image processing apparatus 1.

Figure 2:
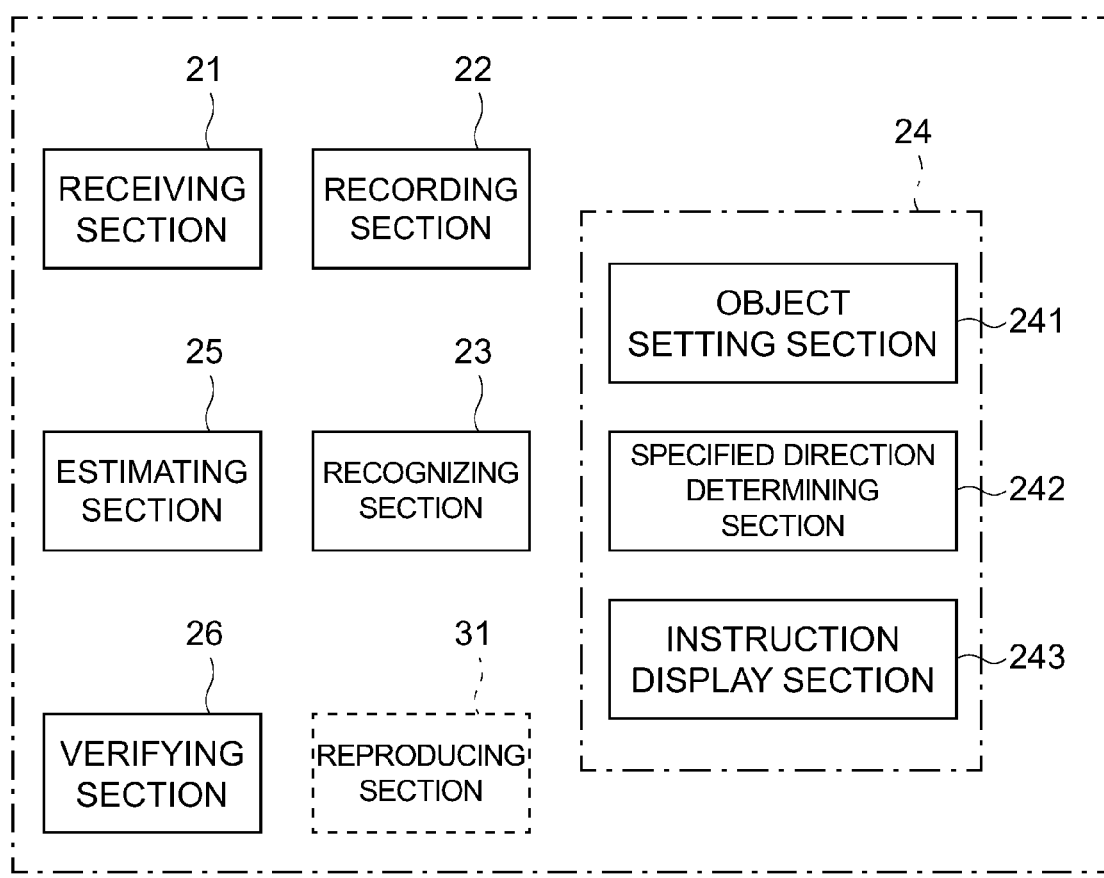
FIG. 2 is a functional block diagram illustrating an example of the image processing apparatus according to the embodiment of the present disclosure.

The operation of the control unit 11 according to the present embodiment will next be described. In the present embodiment, by executing the program stored in the storage unit 12, the control unit 11 implements a configuration functionally including a receiving section 21 (corresponding to receiving section), a recording section 22, a recognizing section 23 (corresponding to recognizing section), an instruction section 24 (corresponding to instruction section), an inferencing section 25 (corresponding to inferencing section), and a verifying section 26 (corresponding to verifying section), as illustrated in FIG. 2. It is to be noted that each piece of sections or each step may have a configuration obtained by combining configurations of the respective sections as appropriate, and that a form of implementation thereof is not limited to a particular one.

A user places a target object to be imaged on a flat surface of a desk or the like and operates the image processing apparatus 1 (for example, a smart phone) to start the program. The imaging unit 16 thereafter sequentially outputs captured images.

The receiving section 21 sequentially receives the captured images obtained by the imaging unit 16 and inputted from the imaging unit 16. The receiving section 21 may output the captured images to the display unit 14 to display the captured images thereon.

The recording section 22 may record the last captured image received by the receiving section 21, in the storage unit 12 according to the intention input from the user.

The recognizing section 23 sets the captured images, which are sequentially received by the receiving section 21, to a processing target (such images will hereinafter be referred to as processing target images) and recognizes the target object appearing in the processing target images. Specifically, the recognizing section 23 assumes that the processing target images are obtained by imaging a three-dimensional space, and defines virtual three-dimensional coordinates (XYZ Cartesian coordinates).

Specifically, the recognizing section 23 extracts predetermined feature points (which may be image feature points obtained by a scale-invariant feature transform (SIFT) or the like) from a processing target image, detects a plane on which the target object is disposed, sets one point on this plane to an origin, and defines XY Cartesian coordinates in parallel with the plane. For example, the recognizing section 23 sets, to a positive direction of Y-coordinates, a direction obtained by projecting a line-of-sight direction of a camera in the last captured processing target image, onto the plane at a time of the coordinate defining processing. Further, the recognizing section 23 sets, to a positive direction of X-coordinates, a direction which is orthogonal to the Y-coordinates and which extends in a right direction when viewed in the positive direction of the Y-coordinates. In addition, the recognizing section 23 sets, to a positive direction of Z-coordinates, a direction normal to the plane. Thus, the recognizing section 23 defines virtual XYZ Cartesian coordinates (referred to as world coordinates). Needless to say, such a method of defining coordinates as described above is an example, and another method may be adopted.

Further, the recognizing section 23 extracts predetermined feature points of the target object from the processing target image and identifies a range in which the target object appears in the image (for example, a rectangular parallelepiped circumscribing the target object) as a bounding box. That is, the recognizing section 23 identifies and obtains a set of vertex coordinates of a polyhedron as the bounding box. Incidentally, the recognizing section 23 sets this rectangular parallelepiped such that the bottom surface of the rectangular parallelepiped coincides with the above-described plane, sets the center of the bottom surface of the rectangular parallelepiped (which is expressed in a world coordinate system) as an origin, and provisionally sets a coordinate system of an x'-, a y'-, and a z-axis which are respectively parallel with the X-, Y-, and Z-axes of the world coordinates. Then, the recognizing section 23 selects one surface of the polyhedron, which is the bounding box, as a front surface direction by a predetermined method, rotates the x'- and y'-axes of the provisionally set coordinate system about the z-axis such that the y'-axis corresponds to a direction normal to the front surface direction (and the positive direction of the y'-axis corresponds to a direction extending from the front surface of the bounding box to the target object), and thus obtains a rotational angle δ. The recognizing section 23 sets the directions of the x'- and y'-axes after being rotated by the rotational angle δ, as an x-axis and a y-axis, respectively, and thus establishes an xyz Cartesian coordinate system of the target object (target object coordinate system).

Here, as a method of selecting the front surface direction, a method of setting, as the front surface, a surface that is the nearest surface in an imaging direction in which a first image is captured and that is the largest surface among the surfaces of the bounding box, a method of making a user select the front surface, and other methods are available, for example. However, the method of selecting the front surface direction is not limited to these examples as long as the method can set the front surface direction of the target object.

In addition, the recognizing section 23 may recognize the name of the target object (item name in a case where the target object is an item) or the like through such processing as comparison with item images for reference which are registered in advance. The recognizing section 23 may determine the shape of the target object on the basis of a result of the recognition of the target object. In the present example, the recognizing section 23 determines the shape of the recognized target object by referring to an information table where information indicating the shape of the target object is associated with the name or the like thereof in advance.

The processing of setting the world coordinate system and the target object coordinate system or recognizing the name and the like can be performed by using an object recognizing function of an ordinary augmented reality (AR) processing module (for example, ARKit provided by Apple Inc. in the U.S., ARCore provided by Google LLC in the U.S., or the like) or by machine learning (processing described in https://ai.googleblog.com/2020/03/real-time-3d-object-detection-on-mobile.html, processing described in Arsalan Mousavian, et al., 3D Bounding Box Estimation Using Deep Learning and Geometry, arXiv: 1612.00496v2, or the like), and therefore, the detailed description thereof will be omitted here. Incidentally, in the present embodiment, the target object disposed on the flat surface of the desk or the like may be a target object disposed on a flat surface having a pattern image such as an AR marker for assisting in object recognition.

The instruction section 24 gives a user an instruction on which direction to capture an image of the target object as the subject. In the example of the present embodiment, as illustrated in FIG. 2, the instruction section 24 includes an object setting section 241, a specified direction determining section 242, and an instruction display section 243.

The object setting section 241 sets a virtual surrounding body of a predetermined shape which circumscribes the bounding box surrounding the imaged target object, the bounding box being obtained by the recognizing section 23, or which includes the bounding box. Here, for example, the virtual surrounding body corresponds to an extended reality (XR) object such as an AR object. Incidentally, while an example in which the virtual surrounding body is set to circumscribe the bounding box or include the bounding box is described in the present embodiment, it is sufficient if the virtual surrounding body is set to include some of feature points of the target object defined thereon, and a form thereof is not limited to the above-described example.

Figure 3:
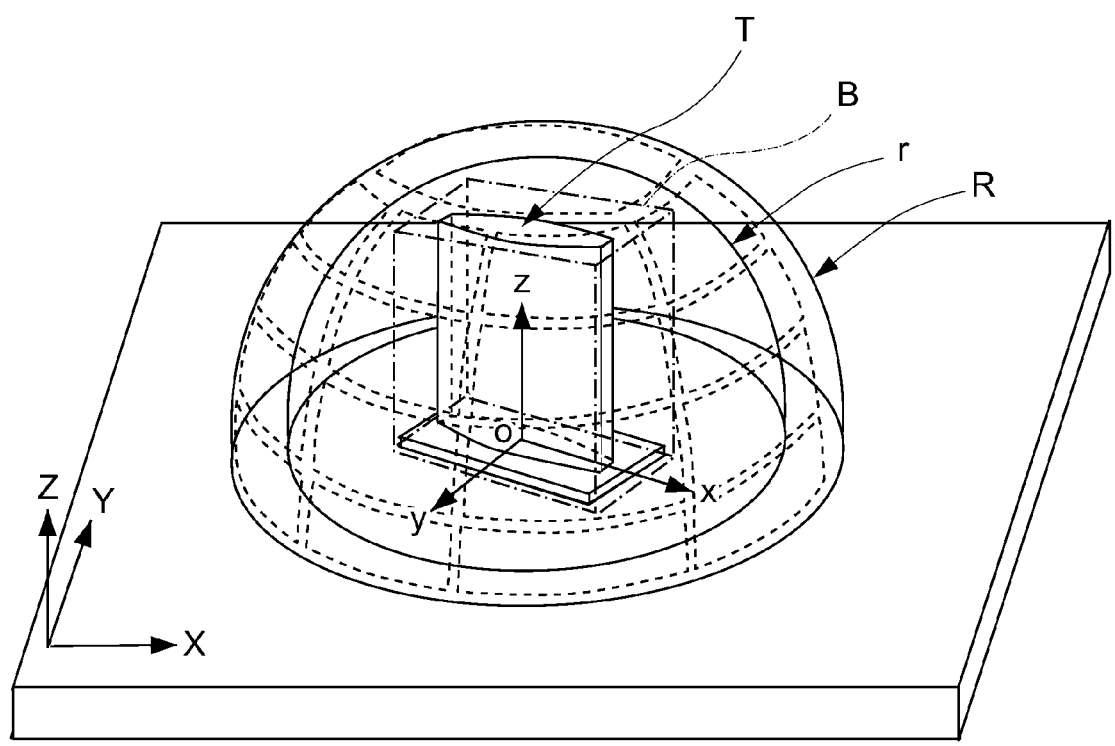
FIG. 3 is an explanatory diagram illustrating an example of a virtual surrounding body set by the image processing apparatus according to the embodiment of the present disclosure.

For example, as illustrated in FIG. 3, the object setting section 241 sets the center of a processing target image which is a captured image of the target object (T), to the origin of the target object coordinate system, virtually sets a hemisphere (r) circumscribing the bounding box (B) set by the recognizing section 23, and further sets a hemisphere (R) obtained by increasing the radius of the hemisphere (r) at a predetermined ratio. Incidentally, the hemisphere (R) may be set to directly include the feature points of the target object or the bounding box (B).

In addition, the object setting section 241 of the instruction section 24 may determine and set the shape of the virtual surrounding body on the basis of the shape of the target object which is determined by the recognizing section 23. For example, in a case where it is determined that the target object forms a rectangular box-shaped body, the instruction section 24 may set a rectangular virtual surrounding body obtained by enlarging the shape of the rectangular box-shaped body. In addition, for example, in a case where it is determined that the target object is of a flat shape exceeding a predetermined ratio, the instruction section 24 may set a flat (thin) rectangular virtual surrounding body in place of the hemispherical shape.

For example, the object setting section 241 further divides a hemisphere surface, which is the surface of the virtual surrounding body, into a plurality of surface objects, and obtains information regarding coordinates indicating each of the surface objects. Here, the hemisphere surface refers to the hemisphere (R). In addition, here, each of the surface objects may be a flat surface. In that case, the hemisphere surface is approximately divided into a plurality of surface objects (corresponding to a mesh), and the information regarding the coordinates indicating each of the surface objects is the value of coordinates of a vertex of each surface object (which may be a value in the target object coordinate system). This dividing method is not limited to a particular one, and it is sufficient if an appropriate method such as a method of mesh division using a finite element method or a Catmull-Clark division (that can be implemented by using an OpenSubDiv library or the like) is adopted. In the present example, the above-described plurality of surface objects correspond to a plurality of virtual objects in the embodiment of the present disclosure. Incidentally, the shape and size of the surface objects obtained by the division do not have to be fixed, and the hemisphere surface may be divided into a plurality of surface objects including meshes of different shapes and sizes.

In addition, the specified direction determining section 242 gives an instruction on which direction to capture an image of the target object. For example, the specified direction determining section 242 may randomly determine angles indicating the imaging direction (a rotational angle α' from the y-axis direction about the z-axis in the target object coordinate system and an elevation angle β' from the xy plane) and output information indicating the determined imaging direction (direction information). Other examples of the specified direction determining section 242 will be described later.

Each time the receiving section 21 receives a captured image, the instruction display section 243 superimposes and displays the virtual surrounding body on the captured image.

Each time the receiving section 21 receives a captured image, the instruction display section 243 determines, in the captured image, each axial direction of the world coordinate system set by the recognizing section 23. This processing can be performed by feature point tracking processing, and can be performed by using the above-described AR processing module or the like. In addition, the instruction display section 243 sets the target object coordinate system on the basis of the world coordinate system (with the use of the coordinates of the origin in the world coordinate system and the rotational angle δ of the x- and y-coordinate axes with respect to an XY coordinate system).

Then, the instruction display section 243 identifies a surface object whose angle information is the closest to the above-described direction information among the surface objects set by the object setting section 241, on the basis of the direction information generated by the specified direction determining section 242. Here, the angle information indicates a direction that is a direction normal to the surface object (direction parallel with a normal to the largest surface of a hexahedron circumscribing the surface object in a case where the surface object is a curved surface) and that is a direction of going away from the origin of the target object coordinate system (which will be referred to as a surface direction).

Here, the angle information indicating the surface direction is defined by a method enabling comparison with the direction information. In this case, the information is represented by the angle $\theta'$ of a line segment about the z-axis in the target object coordinate system, the line segment being parallel with the surface direction in the target object coordinate system and passing through the origin of the target object coordinate system, and by an elevation angle $\varphi'$ of the line segment from the xy plane including the origin.

The instruction display section 243 displays, in a highlighted manner, the surface object identified on the basis of the direction information corresponding to the imaging direction as the instructed direction. In other words, the instruction display section 243 superimposes and displays the surface object which is identified on the basis of the direction information from among the plurality of surface objects generated as described above and the other surface objects on the captured image received by the receiving section 21, in such a manner that the identified surface object and the other surface objects can be distinguished from each other. For example, the instruction display section 243 fills the surface object identified on the basis of the direction information determined by the specified direction determining section 242 and each of the other surface objects with different colors, and translucently synthesizes the resulting surface objects with the captured image.

Figure 4A:
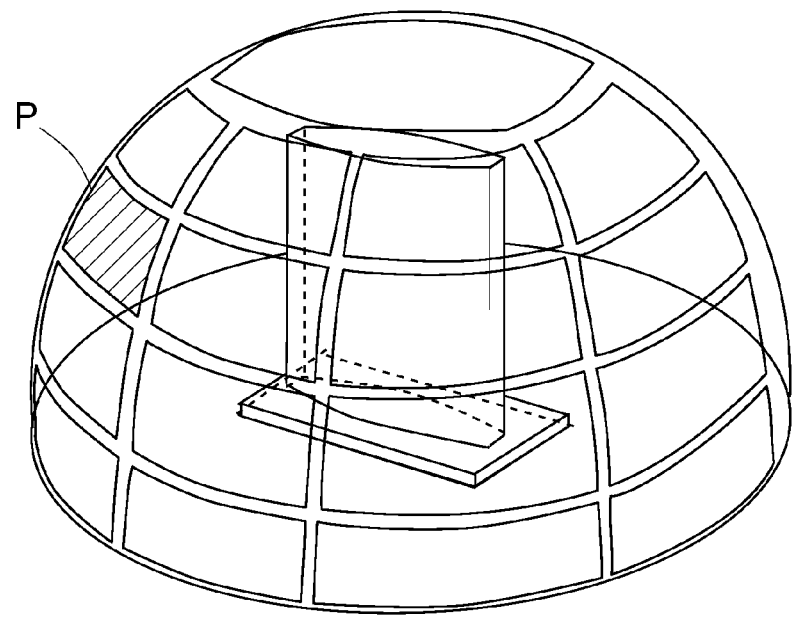
FIGS. 4A and 4B are other explanatory diagrams illustrating the example of the virtual surrounding body set by the image processing apparatus according to the embodiment of the present disclosure.
Figure 4B:
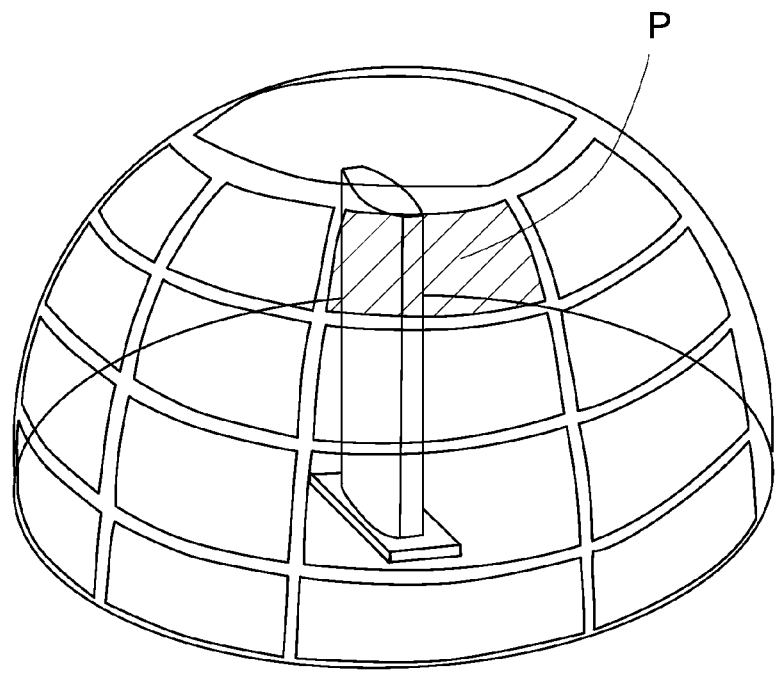

The user can thus recognize, as the instructed direction, the direction of the surface object of the different color among the plurality of surface objects arranged in a spherical shape. In the present example, while an image is captured from a direction different from the direction represented by the direction information, a surface object (P) representing the instructed direction represented by the direction information is displayed in another direction, as illustrated in FIG. 4A. In addition, when the user adjusts the direction and an image is captured from the direction represented by the direction information, the color of a surface object present in a direction close to the direction represented by the direction information is superimposed and displayed on the target object, as illustrated in FIG. 4B. The user may refer to this and perform intention input for recording a captured image (shutter operation or the like). Incidentally, the image of the virtual surrounding body or the like is not synthesized with the captured image recorded by the image processing apparatus 1 according to this input.

Incidentally, while surface objects on the back side of the target object are not illustrated to facilitate viewing of illustrations in the examples of FIG. 3 and FIGS. 4A and 4B, the surface objects on the back side may also be rendered in practice. Further, while the hemisphere is divided into four parts in a latitude direction in the example of FIGS. 4A and 4B, the number of such divisions is determined as desired as long as the number is an integer of 2 or more, and division into more parts may be performed. Similarly, the number of divisions in a longitude direction is also determined as desired as long as the number is an integer of 2 or more.

Then, while referring to an image as a result of the above-described translucent synthesis which is displayed on the display unit 14, the user is requested to capture an image of the target object in the imaging direction in which the user views the target object through the surface object of the different color from that of the other surface objects.

The inferencing section 25 infers the imaging direction on the basis of the captured image received by the receiving section 21. The inferencing section 25 obtains an angular difference $\alpha$ (rotational angle about the z-axis) between the y-coordinates in the xyz Cartesian coordinate system set by the recognizing section 23 and the line-of-sight direction of the camera (vertical direction at the center of the image) and the angle (elevation angle) $\beta$ of the line-of-sight direction of the camera from the xy plane. That is, this inference can be performed by obtaining transformation parameters between a camera coordinate system and the target object coordinate system.

The verifying section 26 performs predetermined verification processing related to the target object (which will hereinafter be referred to simply as verification processing) on the basis of the imaging direction as the instructed direction and the imaging direction as a result of the inference. As a concrete example, the verification processing verifies the existence of the target object. Here, the existence refers to whether or not the target object exists in the hand of a user. That is, the verification processing according to an example of the present embodiment is processing of verifying the existence of the target object, and refers to verifying whether or not the user has captured an image of the target object on the spot. In the example of the present embodiment, the verifying section 26 performs the verification processing on the basis of the imaging direction inferred by the inferencing section 25 and the imaging direction designated by the instruction section 24 (imaging direction represented by the direction information determined by the specified direction determining section 242).

For example, the verifying section 26 obtains a difference $\Delta$ between a set of angles ($\alpha$, $\beta$) and a set of angles ($\alpha'$, $\beta'$). The set of angles ($\alpha$, $\beta$) includes the rotational angle $\alpha$ from the y-axis direction about the z-axis in the target object coordinate system and the elevation angle $\beta$ from the xy plane, and represents the imaging direction inferred by the inferencing section 25. The set of angles ($\alpha'$, $\beta'$) includes the rotational angle $\alpha'$ from the y-axis direction about the z-axis in the target object coordinate system and the elevation angle $\beta'$ from the xy plane, and is represented by the direction information determined by the specified direction determining section 242.

This difference $\Delta$ is an angular difference. Thus, with respect to $\alpha$ and $\alpha'$, for example, it suffices to obtain the difference $\Delta$ as follows.

[Math. 1]

$$\Delta = \arctan 2(\sin(\alpha - \alpha'), \cos(\alpha - \alpha')) \quad (1)$$

where arctan 2 denotes a widely known a tan 2 function.

When this angular difference $\Delta$ is less than a threshold value determined in advance, the verifying section 26 determines that the user has actually captured the image of the target object on the spot, on the basis of the imaging direction represented by the direction information determined by the specified direction determining section 242.

In the present embodiment, the details of the verification processing are not limited to those described above, and verification information based on a result of the verification processing may be included in metadata of the captured image or the like. Examples of such verification information include information obtained by encrypting a hash value computed on the basis of information indicating at least the verification result, in such a manner that the hash value can be decrypted by a public key held in the server apparatus 2 in advance.

<Operation>

The image processing apparatus 1 according to an example of the present embodiment has the above configuration and operates as follows. Incidentally, in the following example, suppose that the server apparatus 2 provides an electronic commerce service such as what is called a C2C marketplace service and receives an upload of a captured image of an item that a user is to put up for sale in the C2C marketplace service.

The user places an item to be put up for sale on the flat surface of a desk or the like in advance. Then, the user operates a smart phone to start the program for making the smart phone function as the image processing apparatus 1. The smart phone thus operates as the image processing apparatus 1.

Figure 5:
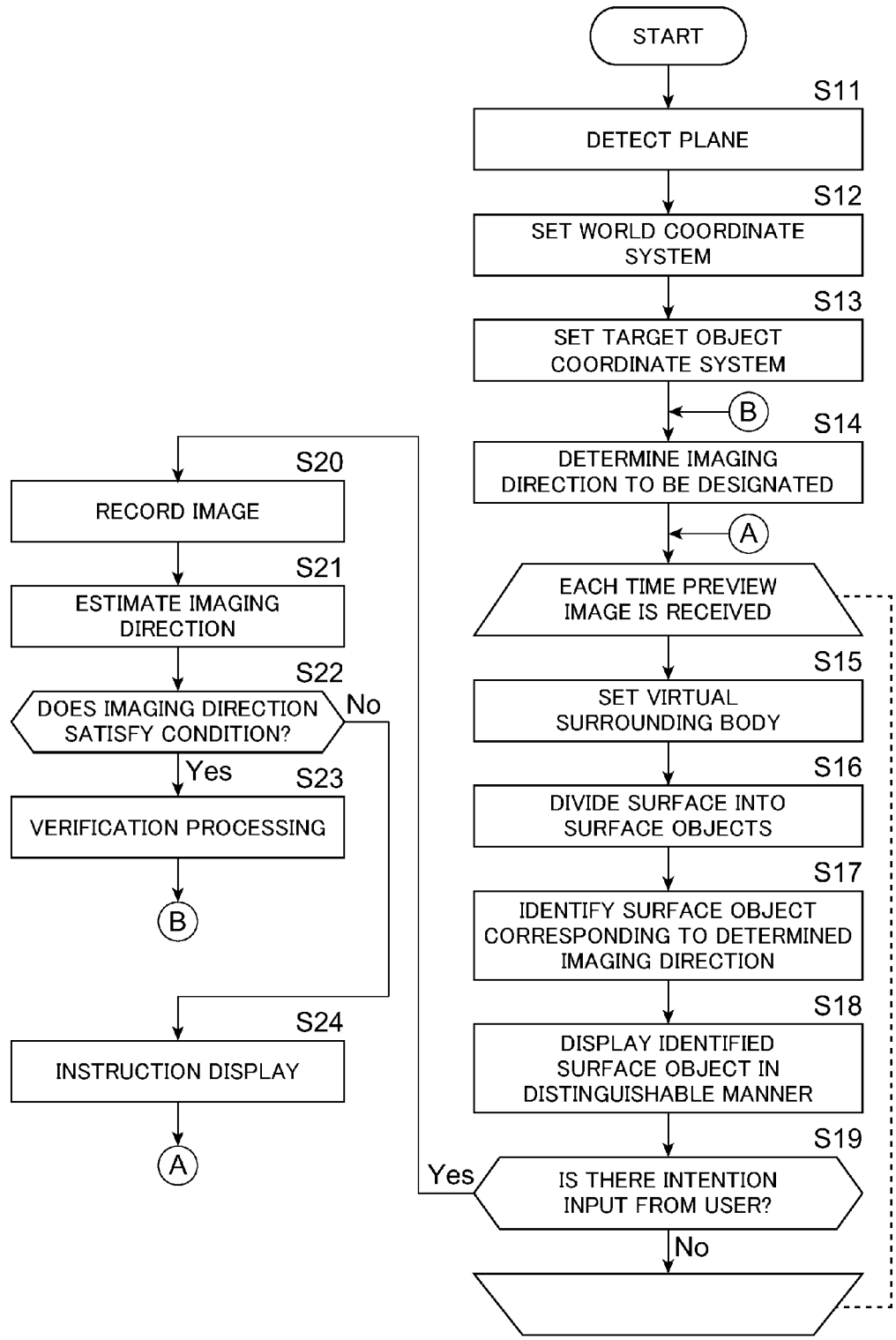
FIG. 5 is a flowchart diagram illustrating an example of operation of the image processing apparatus according to the embodiment of the present disclosure.

The image processing apparatus 1 performs processing of sequentially displaying images captured by the imaging unit 16 as captured images on the display unit 14, and starts processing illustrated in FIG. 5. The image processing apparatus 1 uses the captured image as a processing target image, extracts predetermined feature points from the processing target image, and detects a plane on which the target object is disposed (surface of the desk) (S11).

In addition, the image processing apparatus 1 sets XY Cartesian coordinates on the plane with one point on the detected plane as an origin, and further sets the world coordinate system as a virtual XYZ Cartesian coordinate system with a direction normal to the plane as a direction of Z-coordinates (S12).

Further, the image processing apparatus 1 extracts predetermined feature points of the target object from the processing target image and identifies a rectangular parallelepiped circumscribing the imaged target object, as a bounding box. The image processing apparatus 1 selects one surface of the polyhedron, which is the bounding box, as a front surface direction by such a method as described above. Further, the image processing apparatus 1 defines a y-axis as a direction normal to the surface in the front surface direction, defines an x-axis that is on the plane and that is orthogonal to the y-axis, and defines a z-axis parallel with the Z-axis. Thus, the image processing apparatus 1 sets an xyz Cartesian coordinate system of the target object (target object coordinate system) (S13).

In addition, the image processing apparatus 1 determines angles indicating an imaging direction in which the user is to be instructed to capture an image of the target object (the rotational angle α' from the y-axis direction about the z-axis in the target object coordinate system and the elevation angle β' from the xy plane) (S14). Suppose that, in this case, the rotational angle α' and the elevation angle β' described above are randomly determined in a range of 0≤α'≤2π (radians) and a range of 0≤β'≤π/2 (radians), respectively.

Thereafter, each time the image processing apparatus 1 receives a captured image from the imaging unit 16, the image processing apparatus 1 sets, while performing display output of the captured image to the display unit 14, a virtual surrounding body in a hemispherical shape that circumscribes the bounding box surrounding the target object appearing in the captured image or that includes the bounding box (S15).

The image processing apparatus 1 divides the surface of the hemisphere set in step S15, into a plurality of surface objects (S16). In this case, suppose that each of the surface objects is a flat surface, and the shape and position of each of the surface objects are expressed in the target object coordinate system.

In addition, the image processing apparatus 1 determines each axial direction in the world coordinate system in the received captured image by a method of feature point tracking or the like. Further, the image processing apparatus 1 identifies a surface object whose angle information is the closest to the above-described direction information among the surface objects set in step S16, on the basis of the direction information determined in step S14. The angle information indicates a direction that is a direction normal to the surface object (direction parallel with a normal to the largest surface of a hexahedron circumscribing the surface object in a case where the surface object is a curved surface) and that is a direction of going away from the origin of the target object coordinate system (which will be referred to as a surface direction) (S17).

Then, the image processing apparatus 1 translucently synthesizes the surface object identified on the basis of the direction information and the other surface objects with the captured image and displays the resultant image in such a manner that the identified surface object and the other surface objects can be distinguished from each other (S18).

The image processing apparatus 1 repeats the processing of step S14 to step S18 until the user performs predetermined intention input (operation indicating an intention of recording an image) (while No is obtained in S19). Incidentally, when the user performs the above-described intention input (S19: Yes), the last captured image may be recorded (S20).

The image processing apparatus 1 infers the imaging direction in which the image of the target object is captured (S21). The image processing apparatus 1 checks whether or not a difference between the imaging direction inferred in step S21 and the imaging direction determined in step S14 is less than a threshold value determined in advance (S22).

Then, when this difference is less than the threshold value determined in advance (S22: Yes), the image processing apparatus 1 performs verification processing for including predetermined verification information in the captured image recorded in step S20 (S23). In addition, when the above-described difference is not less than the threshold value determined in advance in step S22 (S22: No), the image processing apparatus 1 displays a message requesting the user to capture an image of the target object from the specified imaging direction (S24: instruction display), returns to step S14 or step S15, and continues the processing (A).

Incidentally, even after performing step S23, the image processing apparatus 1 may return to step S14 and continue the processing to further obtain another captured image (B).

When an ending condition determined in advance is satisfied, the image processing apparatus 1 ends the processing in FIG. 5, and sends out and uploads the captured images recorded during the processing in FIG. 5 to the server apparatus 2.

The server apparatus 2 determines whether or not the predetermined verification information is included in the captured images. When the verification information is included in the captured images, the server apparatus 2 presents the captured images to other users together with information indicating that the verification information is included in the captured images.

In the present example, when a certain user captures images of an item to put up the item for sale, the user uses the image processing apparatus 1 according to the present embodiment to upload, to the server apparatus 2, at least one image of the item captured from a direction specified by the image processing apparatus 1. At this time, the image processing apparatus 1 includes verification information in the captured image on the basis of a fact that the image of the item is captured from the direction specified by the image processing apparatus 1 itself.

Consequently, the server apparatus 2 can present the image of the item to other users (intending purchasers) together with information verifying that the image is obtained by capturing an image of the item that the user who puts up the item for sale has on hand, and a user as an intending purchaser can perform a purchase procedure at ease by referring to the verified image.

<Modifications of Direction Specification>

In the example illustrated thus far, the image processing apparatus 1 randomly determines an imaging direction to be designated to capture an image of the target object, as processing performed by the specified direction determining section 242 (processing of step S14 in FIG. 5). However, the present embodiment is not limited to this example.

For example, the instruction section 24 may give an additional instruction to capture an image of the target object in another direction, on the basis of the imaging direction as a result of inference by the inferencing section 25. At this time, the inferencing section 25 performs an additional inference of an imaging direction on the basis of an image of the target object which is captured according to the additional instruction and is then received. The verifying section 26 performs the verification processing further on the basis of the other direction based on the additional instruction and the imaging direction as a result of the additional inference. Incidentally, the instruction section 24 may repeat the additional instruction and the additional inference a plurality of times.

When the image processing apparatus 1 obtains, for example, a plurality of captured images by repeatedly performing the processing illustrated in FIG. 5, the image processing apparatus 1 may designate other directions except the direction in which an image has been captured and recorded in the past.

In the present example, the specified direction determining section 242 stores direction information determined in the past (for example, for a predetermined number of times in the past or after the program is started this time). Then, when the specified direction determining section 242 determines the rotational angle $\alpha'$ from the y-axis direction about the z-axis in the target object coordinate system and the elevation angle $\beta'$ from the xy plane as angles representing the imaging direction to be designated, the specified direction determining section 242 provisionally and randomly determines the rotational angle $\alpha'$ and the elevation angle $\beta'$ in a range of $0 \leq \alpha' \leq 2\pi$ (radians) and a range of $0 \leq \beta' \leq \pi/2$ (radians), respectively. When differences (obtained by the above-described Equation (1)) between the angles determined provisionally and randomly and angles included in the stored direction information determined in the past both exceed a threshold value determined in advance, the specified direction determining section 242 outputs the imaging direction represented by the angles determined provisionally, as recommended direction information. In addition, when the differences between the angles determined provisionally and the angles determined in the past do not exceed the threshold value determined in advance, the processing of provisionally and randomly determining angles representing an imaging direction is repeated.

In addition, when the differences between the angles determined provisionally and randomly and predetermined angles do not exceed a threshold value determined in advance, the processing of provisionally and randomly determining angles representing an imaging direction may be repeated. Here, with regard to the predetermined angles, a plurality of predetermined angles are defined as angles representing directions in which images of the target object are relatively commonly captured, such as a front surface direction (a direction representing the front surface is obtained in advance; incidentally, in a method of identifying the front surface, a direction normal to the largest surface of the set bounding box may be selected as the front surface, for example), a side surface, and a back surface of the target object. According to this example, a direction determined randomly can be prevented from being a typical direction.

Figure 6A:
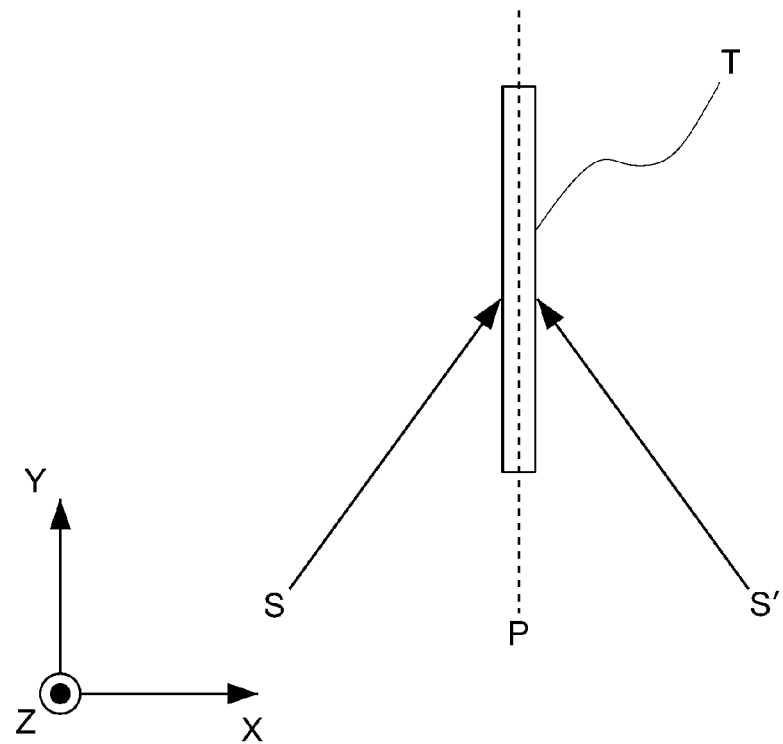
FIGS. 6A and 6B are explanatory diagrams illustrating an example of an imaging direction indicated by the image processing apparatus according to the embodiment of the present disclosure.
Figure 6B:
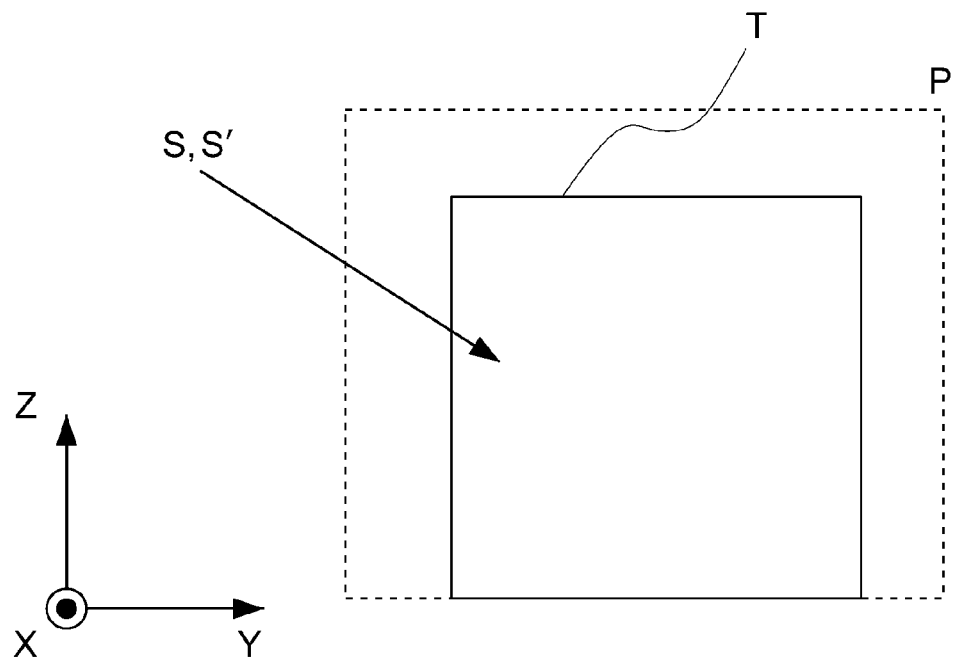

Further, the specified direction determining section 242 may determine an imaging direction to be designated, on the basis of results of inference of imaging directions in which images of the target object have been captured and recorded in the past (for example, for a predetermined number of times in the past or after the program is started this time). For example, the specified direction determining section 242 refers to information regarding the imaging directions which are inferred by the inferencing section 25 on the basis of the captured images of the target object recorded in the past, and generates direction information representing an imaging direction (another direction) different from the inferred imaging directions. As a concrete example, the other direction may be a direction opposed to the imaging direction inferred on the basis of a captured image recorded last time, with the target object interposed therebetween. In addition, when the previous imaging direction is a direction represented by the rotational angle $\alpha'$ from the y-axis direction about the z-axis in the target object coordinate system and the elevation angle $\beta'$ from the xy plane, the specified direction determining section 242 may set $\alpha''$ and $\beta''$ representing a new imaging direction, in such a manner as $\alpha''=\alpha'+\pi$ and $\beta''=\beta'$, respectively. Incidentally, FIGS. 6A and 6B illustrate an imaging direction S that is obtained as a result of the inference by the inferencing section 25 and that is a direction in which an image of a target object T is captured, and another direction S' based on the additional instruction may be in a mirror-image relation to the imaging direction S and be positioned at a revers position with respect to a predetermined symmetry plane P. Here, the symmetry plane P may be defined as a plane passing through the center of the target object (which may be the center of the bounding box surrounding the target object). FIG. 6A is a plan view as viewed from a direction normal to an XY plane. FIG. 6B is a right side view as viewed from a direction normal to a ZY plane. In the example of FIGS. 6A and 6B, the symmetry plane P is set in parallel with the ZY plane in order to simplify the description. In addition, the above-described other direction may be a direction facing the imaging direction obtained as a result of inference by the inferencing section 25, or may be a direction corresponding to another surface object adjacent to a surface object corresponding to the imaging direction obtained as a result of inference by the inferencing section 25.

Incidentally, in this case, when differences (it suffices to compute the differences by Equation (1)) from angles represented by information regarding an imaging direction in which an image of the target object is captured and which is inferred by the inferencing section 25 on the basis of an image captured and recorded after the program is started this time are less than the predetermined threshold values, the image processing apparatus 1 may end the imaging processing.

In another example, the specified direction determining section 242 may determine imaging directions that are necessary to reproduce a three-dimensional shape of the target object, on the basis of recorded captured images, and determine one of the imaging directions that is different from an imaging direction in which imaging is already performed, as the other direction in which to image the target object. Incidentally, the image processing apparatus 1 may further include a reproducing section 31 corresponding to reproducing section for reproducing the three-dimensional shape of the target object on the basis of a plurality of images captured in different imaging directions. Incidentally, the reproducing section 31 is not necessarily needed in a case where the reproduction of the three-dimensional shape is not performed. Hence, the reproducing section 31 is indicated by a broken line in FIG. 2.

Such processing can be performed by using a method disclosed in, for example, Manabu Nishiyama et al., "Multiple Viewpoint Camera Work Optimization for High Definition Three-Dimensional Shape Reconstruction" (https://vision.kuee.kyoto-u.ac.jp/japanese/happyou/pdf/Nishiyama_2004_P_173.pdf) or the like.

Further, the specified direction determining section 242 may determine an imaging direction in consideration of the kind of the target object. In the present example, the specified direction determining section 242 refers to information regarding the shape of the target object which is obtained by the recognizing section 23 or the like, and determines the imaging direction to be designated, from the information regarding the shape and information regarding imaging directions in which images of the target object are captured and which are inferred by the inferencing section 25 on the basis of the images captured and recorded in the past, for example, after the program is started this time.

For example, when the shape of the target object which is obtained by the recognizing section 23 is a cylindrical shape, the specified direction determining section 242 determines, as the imaging direction to be designated, information regarding an imaging direction whose elevation angle is made different from an angle represented by information regarding the imaging direction in which an image of the target object is captured and which is inferred by the inferencing section 25. That is, the obtainment of the same image in a case of a symmetric shape is avoided. Similarly, in a case of the shape of an N-gonal prism, the imaging direction may be determined while avoiding the direction of an angle of $2\pi/N \times m$ (m is a natural number) radians in a rotational angle about the z-axis with respect to a direction in which imaging has been performed in the past.

In addition, when the recognizing section 23 obtains information regarding the name of the target object or the like, while avoiding an imaging direction specified in advance in association with the obtained name, the specified direction determining section 242 may determine the imaging direction to be designated. Alternatively, the specified direction determining section 242 may determine, as the imaging direction to be designated, a direction obtained by changing an already used imaging direction by an angle specified in advance in association with the name obtained by the recognizing section 23.

According to this example, in a case where a setting is made such that angles obtained by moving, for example, an item having an item name "playing cards" by $\pi/7$, $2\pi/7$, $3\pi/7$, . . . about the z-axis in advance are determined as imaging directions to be designated, the specified direction determining section 242 sequentially designates angles obtained by moving the item by $\pi/7$, $2\pi/7$, $3\pi/7$, . . . about the z-axis with respect to the imaging direction inferred on the basis of a captured image. According to this example, it is possible to avoid an angle corresponding to a characteristic of the item or give an instruction to capture an image at an angle determined according to the characteristic.

<Modifications of Shape of Virtual Surrounding Body>

Figure 7:
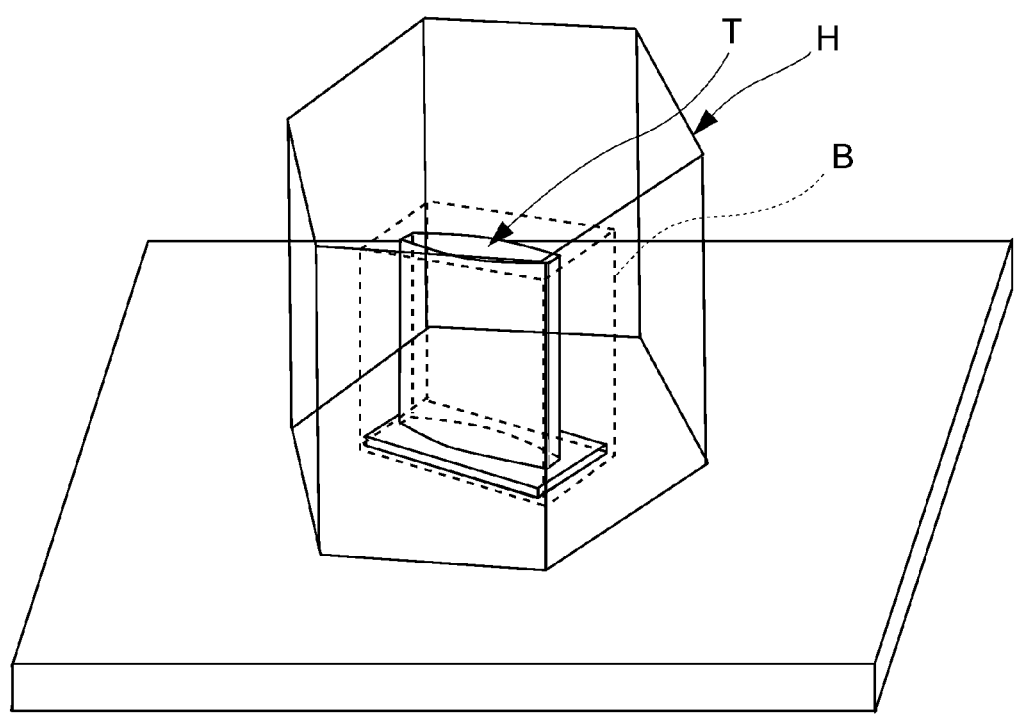
FIG. 7 is an explanatory diagram illustrating another example of the virtual surrounding body set by the image processing apparatus according to the embodiment of the present disclosure.

In addition, in the present embodiment, the shape of the virtual surrounding body is not limited to a hemisphere as described above. The virtual surrounding body may have, for example, the shape of a polygonal prism such as a hexagonal prism or an octagonal prism as illustrated in FIG. 7, or may be of a shape obtained by combining polygons with one another, such as the shape of a soccer ball. In FIG. 7, a hexagonal prism (H) shape is illustrated by way of example.

Further, in a case where the virtual surrounding body is divided into a plurality of surface objects, the divided surface objects may have shapes different from each other. Incidentally, it is conceivable that, depending on the method of dividing a virtual surrounding body into surface objects, a virtual surrounding body having a relatively large surface, such as a columnar body, may be divided into a plurality of surface objects having normals extending in identical directions. It is to be noted that each of the plurality of surface objects may have a rectangular shape or a triangular shape and does not need to have the same area, and that the geometric feature and area of each of the plurality of surface objects are not limited to particular ones.

Accordingly, in a case where a virtual surrounding body is divided into a plurality of surface objects having normals extending in the identical directions, the image processing apparatus 1 may group the plurality of surface objects having the normals extending in the identical directions, as one surface object. That is, when a surface object having a normal closest to a direction included in the recommended direction information is selected and there is another surface object having a normal extending in the same direction as the selected surface object, the image processing apparatus 1 treats the other surface object as a selected surface object.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a receiving section that receives a captured image of a target object;
   an instruction section that gives a user an instruction on which direction to capture an image of the target object;
   an inferencing section that performs an inference of an imaging direction on a basis of the received captured image; and
   a verifying section that performs predetermined verification processing related to the target object on a basis of an imaging direction as the instructed direction and the imaging direction as a result of the inference.

2. The image processing apparatus according to claim 1, further comprising:
   a recognizing section that performs recognition of the target object by extracting feature points of the target object on a basis of the captured image; and
   a display section that displays a virtual surrounding body including the feature points of the target object in such a manner as to superimposes the virtual surrounding body on the target object on a basis of a result of the recognition and that displays, in a highlighted manner, a region of the virtual surrounding body corresponding to the imaging direction as the instructed direction.

3. The image processing apparatus according to claim 2, wherein
the recognizing section determines a shape of the target object on the basis of the result of the recognition, and
the display section determines a shape of the virtual surrounding body on a basis of the shape of the target object.

4. The image processing apparatus according to claim 2, wherein
the virtual surrounding body includes a plurality of surface objects, and
the display section displays, in a highlighted manner, a surface object corresponding to the imaging direction as the instructed direction.

5. The image processing apparatus according to claim 1, wherein
the instruction section gives an additional instruction to capture an image of the target object in another imaging direction, on a basis of the imaging direction as the result of the inference,
the inferencing section performs an additional inference of an imaging direction on a basis of an image of the target object that is captured according to the additional instruction and is then received, and
the verifying section performs the predetermined verification processing further on a basis of the other imaging direction based on the additional instruction and the imaging direction as a result of the additional inference.

6. The image processing apparatus according to claim 2, further comprising:
a reproducing section that performs reproduction of a three-dimensional shape of the target object on a basis of a plurality of images of the target object captured in different imaging directions, wherein
the other imaging direction based on the additional instruction is an imaging direction that is included in a plurality of imaging directions necessary for the reproduction and that is different from the imaging direction based on the inference.

7. The image processing apparatus according to claim 5, wherein
the other imaging direction based on the additional instruction is an imaging direction that is in a mirror-image relation to the imaging direction as the result of the inference.

8. The image processing apparatus according to claim 5, further comprising:
a display section that displays a virtual surrounding body including feature points of the target object in such a manner as to superimposes the virtual surrounding body on the target object on a basis of a result of recognition of the target object and that displays, in a highlighted manner, a region of the virtual surrounding body corresponding to the imaging direction as the instructed direction, wherein
the virtual surrounding body includes a plurality of surface objects, and
the other imaging direction based on the additional instruction is a direction corresponding to another surface object adjacent to a surface object corresponding to the imaging direction as the result of the inference.

9. An image processing method comprising:
by a processor of a computer,
receiving a captured image of a target object;
giving a user an instruction on which direction to capture an image of the target object, wherein giving the user the instruction includes obtaining an angular difference a between y-coordinates in an xyz Cartesian coordinate system set by the processor, a line-of-sight direction of a camera, and an elevation angle of the line-of-sight direction of the camera from an xy plane;
performing an inference of an imaging direction on a basis of the received captured image; and
performing predetermined verification processing related to the target object on a basis of an imaging direction as the instructed direction and the imaging direction as a result of the inference, wherein the predetermined verification processing includes obtaining an angular difference A according to the equation A=arctan 2 $(\sin(\alpha-\alpha'), \cos(ca-cx))$, and comparing A to a preset threshold.

10. A non-transitory information storage medium storing program code that, when executed by at least one of at least one processor, causes the at least one processor to:
receive a captured image of a target object;
give a user an instruction on which direction to capture an image of the target object, wherein giving the user the instruction includes obtaining an angular difference a between y-coordinates in an xyz Cartesian coordinate system set by the at least one processor, a line-of-sight direction of a camera, and an elevation angle of the line-of-sight direction of the camera from an xy plane;
perform an inference of an imaging direction on a basis of the received captured image; and
perform predetermined verification processing related to the target object on a basis of an imaging direction as the instructed direction and the imaging direction as a result of the inference, wherein the predetermined verification processing includes obtaining an angular difference A according to the equation A=arctan 2 $(\sin(\alpha-\alpha'), \cos(ca-cx))$, and comparing A to a preset threshold.

* * * * *